SYNCHRONOUS DEMODULATION SYSTEM

Filed Dec. 16, 1957 2 Sheets-Sheet 1

Inventor
JOSEPH W. HALINA
By [signature]
Attorney

April 11, 1961 J. W. HALINA 2,979,611

SYNCHRONOUS DEMODULATION SYSTEM

Filed Dec. 16, 1957 2 Sheets-Sheet 2

Inventor
JOSEPH W. HALINA
By [signature]
Attorney 2,979,611

SYNCHRONOUS DEMODULATION SYSTEM

Joseph W. Halina, Burlingame, Calif., assignor to International Telephone and Telegraph Corporation, Nutley, N.J., a corporation of Maryland Filed Dec. 16, 1957, Ser. No. 702,987
6 Claims. (Cl. 250—20)

This invention refers to a synchronous demodulation system and more particularly to a synchronous demodulation system for a double sideband suppressed carrier communication system.

Suppressed carrier communication systems are of great interest and value because of the substantial saving in power that they make possible. There are advantages that accrue in the use of double sideband suppressed carrier, although single sideband suppressed carrier has been emphasized as a logical replacement for amplitude modulation. It is less costly to convert existing amplitude modulation equipment to double sideband suppressed carrier operation than to single sideband suppressed carrier operation. There is no power advantage in the use of single sideband over the double sideband system, and the double sideband is less susceptible to jamming. It is necessary, however, to have more efficient detection methods in the amplitude modulation receiver than is afforded by the heterodyne system in association with square law envelope detectors. Detection methods have been suggested which require the use of a phase lock oscillator and a synchronous or coherent detector, but in such instances the phase comparison has been obtained from the audio output. The synchronized oscillator is controlled by a discriminator which functions on the detected modulating frequency and is thus a servo-loop method of establishing and maintaining synchronism. This system, however, is too complex and requires two basic receivers. Another major problem involved in the reception of double sideband suppressed carrier modulation is the addition of a locally generated carrier to the sidebands in the correct phase and frequency. Frequency instability in either the transmitter or receiver further complicates this problem.

It is an object of this invention to provide a synchronous demodulator system for a double sideband suppressed carrier receiving system, which uses a computer to deduce from the two sidebands the necessary information that is required to provide a phase locked and synchronized generated carrier.

A feature of this invention is a circuit to which is fed input radio signals containing the upper and lower sidebands with the carrier suppressed. Means are provided to derive from these input signals a mixture of signals including a given signal having a frequency corresponding to a multiple of the suppressed carrier frequency and 180 degrees in phase coincidence with the suppressed carrier. An oscillator in this circuit is tuned to oscillate at approximately the frequency of the suppressed carrier, and is responsive to said given signal to pull the oscillator into synchronism and phase coincidence with the frequency of the suppressed carrier.

A further feature is that the circuit includes rectifying and clipping means to convert the input signals into the mixture of signals including a given signal having a frequency corresponding to a given multiple of the suppressed carrier frequency and a signal having a frequency corresponding to a multiple of the modulation frequency.

Another feature is that the oscillator is synchronized to and phase locked to a frequency equal to the frequency of the given signal multiplied by the reciprocal of the given multiple and thereby generates an output signal which is equal to and in phase coincidence with the suppressed carrier, and means are provided to combine the oscillator output signals with the input signals to obtain therefrom the modulation intelligence of the input signals.

The above-mentioned and other features and objects of this invention and the manner of attaining them will become more apparent by reference to the following description taken in conjunction with the accompanying drawings, in which.

Figure 1:
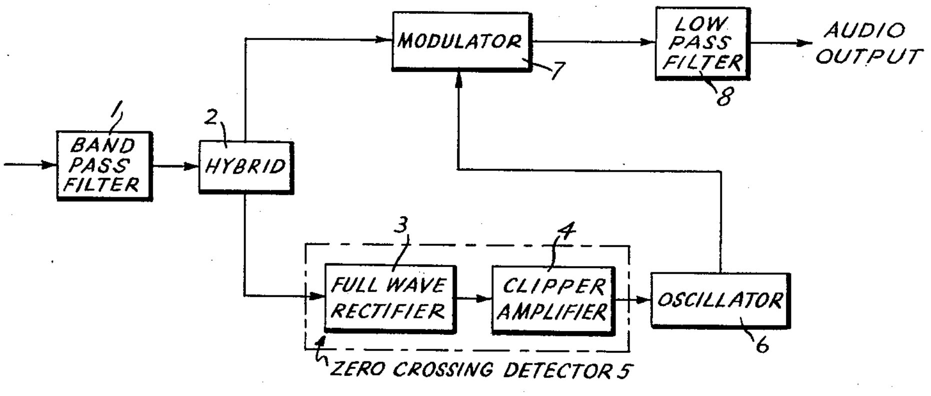
Fig. 1 is a block diagram of the circuit elements of this invention.

With reference to Fig. 1, there is shown a band-pass filter 1 to which is fed input radio signals and which is capable of passing only the upper and lower sidebands of the double sideband suppressed carrier signals. The output of the band-pass filter 1 is fed to a hybrid coupler 2, whence it is coupled to a full-wave rectifier 3. The output of the full-wave rectifier 3 is fed into a clipper amplifier 4. The combination of the operations performed by the full-wave rectifier 3 and the clipper amplifier 4 may be included in one device 5 called a zero crossing detector, the function of which will be explained later. The output of the clipper amplifier 4 is fed into a modified Colpitts or Hartley oscillator 6, the output of which is coupled to modulator 7. The output of the band-pass filter 1 is also coupled through the hybrid coupler 2 to the modulator 7. The resultant signal output of the modulator 7 is coupled to low-pass filter 8, which passes only the required detected modulating signals. The presence of the band-pass filter 1 is discretionary and is a function of the magnitude and density of signals on the receiving medium from which the upper and lower sideband signals are to be extracted. The purpose of the filter 1 is dual; the first is extrinsic and relates to paralleling many such receivers together to receive their specific signals from a common medium; the second is intrinsic and relates to the need for isolating from the oscillator 6 unwanted signals which might be of a magnitude to take control of the oscillator or perturb severely its performance. The hybrid 2 can be any well known means of coupling the output of filter 1 to the two loads, the full-wave rectifier 3 and the modulator 7.

The general equation for amplitude modulation is $$f(t)=A\cos\omega_o t(1+m\cos\omega_a t) \qquad (a)$$

$$=A\cos\omega_o t+mA\cos\omega_o t\cos\omega_a t \qquad (b)$$

$$=A\cos\omega_o t+\frac{mA}{2}\cos(\omega_o+\omega_a)t+\frac{mA}{2}\cos(\omega_o-\omega_a)t \qquad (c)$$

$$\text{or } =A\cos\theta_c+\frac{mA}{2}\cos\theta_u+\frac{mA}{2}\cos\theta_e \qquad (d)$$

of which $A\cos\theta_c$ in equation $d$ represents the carrier and the other two terms represent the upper and lower sidebands. In the double sideband suppressed carrier case, the carrier drops out giving $$f_2(t)=\frac{m}{2}\cos\theta_u+\frac{m}{2}\cos\theta_e,\ for\ A=1 \qquad (e)$$

Equation $e$ can be converted back to the form of the second term of Equation $b$ in the following steps:

$$f_2(t)=\frac{m}{2}\cos\theta_u+\frac{m}{2}\cos\theta_e$$

$$=m \cos \frac{\theta_u+\theta_e}{2} \cos \frac{\theta_u-\theta_e}{2} \qquad (f)$$

$$=m \cos \theta_c \cos \theta_a \qquad (g)$$

Thus the desired $\theta_c$ is present in Equation *e* as indicated in Equation *g*. Since it exists in Equation *g* as a multiplier, it is not possible to extract $\theta_c$ from Equation *e* by linear filtering. One the other hand, a non-linear filter is required to perform the computations of Equation *f*, that is, add $\theta_u$ and $\theta_e$ and divide by 2, and divide by $\theta_a$. The problem may be further explored by considering the zero crossings of the Expression *e* and counting by N.

Let
$$\tau(t)=g[f(t)=0_N] \qquad (h)$$

$$\left[\sum_{n_1=1}^{\infty} A_{n1} \sin \frac{2\theta_c}{N}\right]\left[\sum_{n_2=1}^{n-1} \sum_{n=u}^{\infty} J_n\left(\frac{2}{n_2}\right) \cos nn_2\frac{2\theta_a}{N}\right] + \sum_{n_3=1}^{\infty} A_{n3} \sin n_3\frac{2\theta_a}{N} \qquad (j)$$

now for $N=2$ $$\tau(t)=\left[\sum_{n_1=1}^{\infty} A_{n1} \sin n_1\theta_c\right]\left[\sum_{n=0}^{\infty} J_n(1) \cos n\theta_a\right] + \sum_{n_3=1}^{\infty} A_{n3} \sin n_3\theta_a \qquad (k)$$

The infinite series in $n_1$ and $n_3$ results from representing the zero crossings by a waveform approaching the impulse function $\varphi(t)$ and need not perturb us.

The implications of Equation *k* are that, if the zero crossings of Equation *e* are detected and counted by 2, we would derive a phase modulation spectrum around the carrier frequency and its multiples as well as the signal frequency and its multiples, both shifted by 90 degrees. Consider Equation *j* for $N=1$; then $$\tau(t)=\sum_{n_1=1}^{\infty} A_{n1} \sin n_1 2\theta_c + \sum_{n_3=1}^{\infty} A_{n3} \sin n_3 2\theta_a \qquad (m)$$

The mixed signals of Equation *m* contain linear summations of $2\theta_c$ plus harmonics and $2\theta_a$ plus harmonics. $\theta_c$ can be extracted by filtering the first part from the second part and dividing the first part $2\theta_c$ by 2. Equation *m* can be approached as closely as desired by means of a full-wave rectifier and wave shaper.

Figure 2:
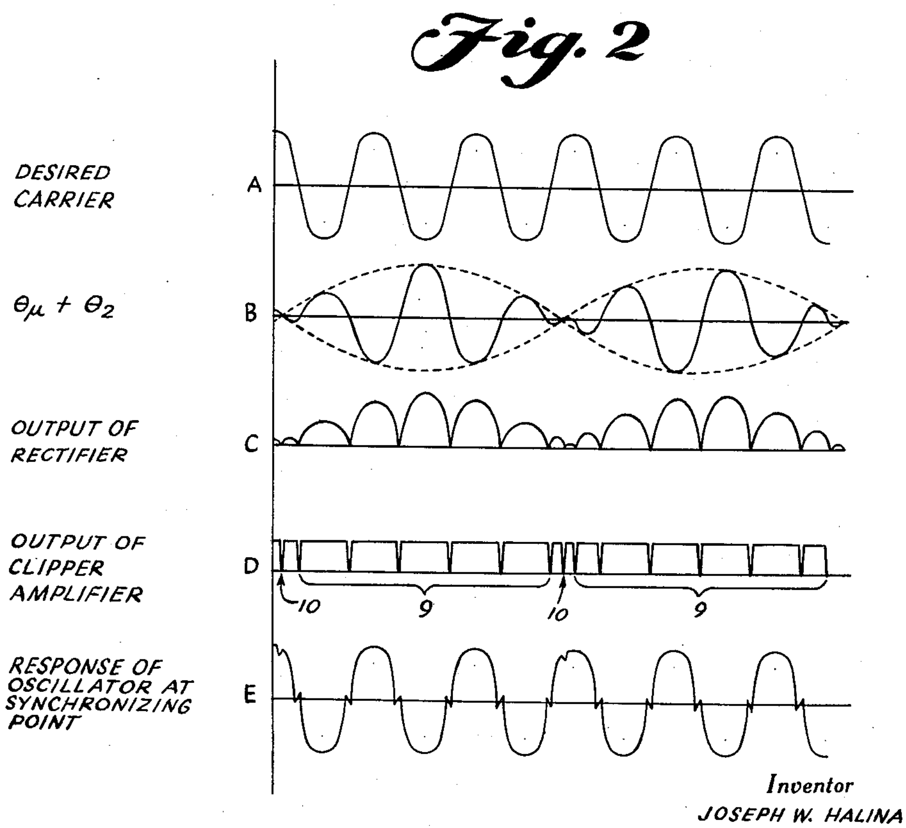
Fig. 2 is a graph of the waveforms of the signals occurring at various positions in the circuitry.

In Fig. 2 there is shown the waveform A, which is the desired carrier frequency; waveform B is the received signals containing the upper and lower sidebands with the carrier modulated by a simple sine wave; waveform C is the output of the full-wave rectifier 3. After clipping and amplifying in the clipper amplifier, waveform D results as the output of the clipper amplifier 4 having a uniform voltage level except for the spikes of zero voltage which represent the zero crossover points of the signal B, and contains the given signals having twice the carrier frequency and the signals having twice the modulating frequency as described by Equation *m*. In other words, there results a D.C. value which may be neglected plus the even harmonics of the carrier frequency and the modulating frequency. When the output of the clipper amplifier 4 is injected into the oscillator 6 at the synchronizing point 8, shown in Fig. 3, waveform E results as a combination of the oscillator waveform and waveform D.

Figure 3:
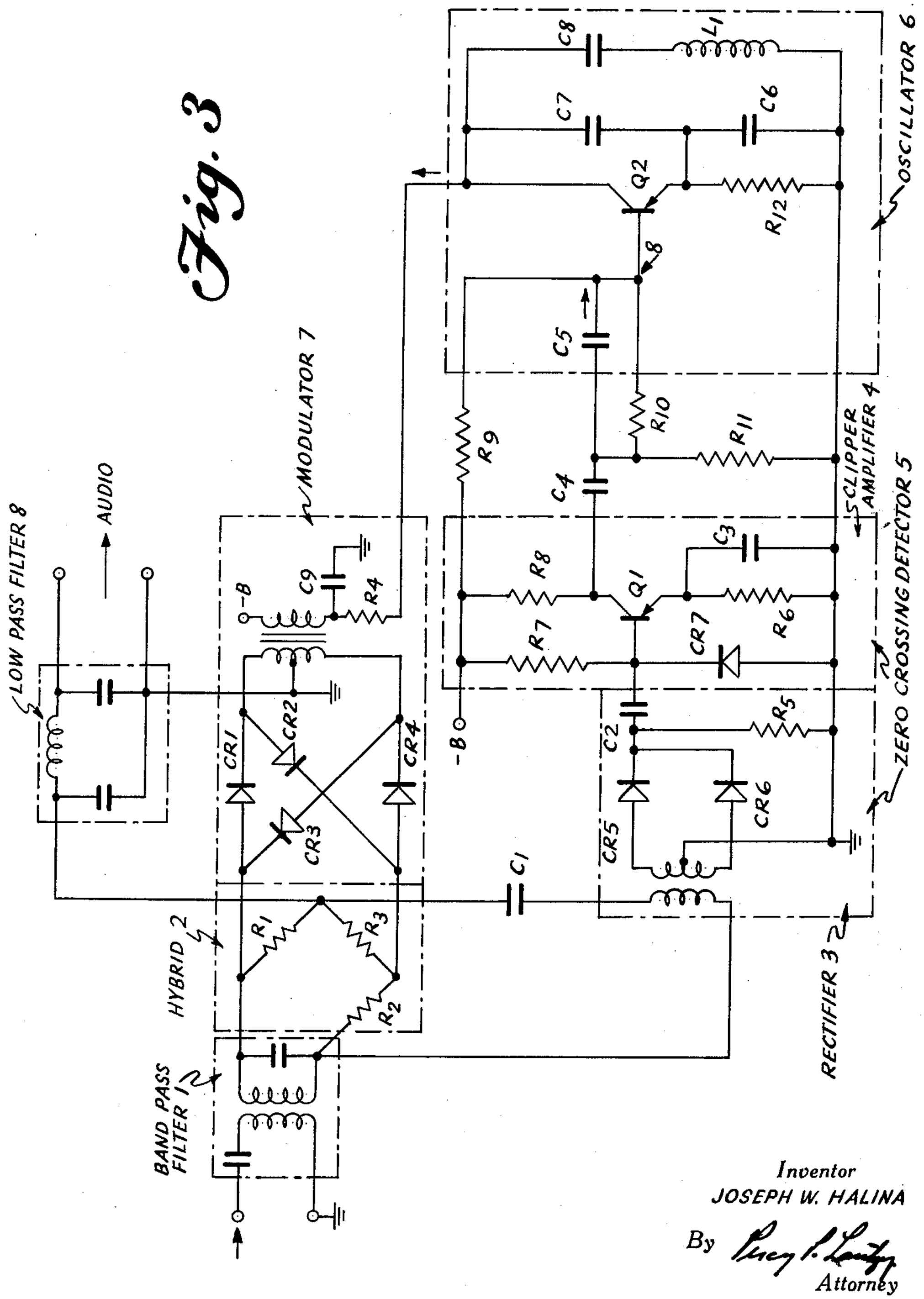
Fig. 3 is a schematic diagram of the circuitry of this invention.

It is a property of a Colpitts or Hartley oscillator that if the Q of its tank is suitably low and its free-running frequency an even submultiple of an input signal, it will synchronize in the manner shown in waveform E. With reference to Fig. 3, the operation of the oscillator 6 will now be described. The synchronizing impulses directed to the oscillator 6 are derived from the incoming signal 2B by rectification to produce the signals of 2D, the output of the clipper amplifier 4. These impulses are then applied to the base electrode of transistor Q2. The oscillator 6 can be one of many types, such as Colpitts, Hartley, etc. The one shown in Fig. 3 is a tuned collector oscillator with emitter feedback. The special operating point for this oscillator is class C operation with an angle of conduction between 0 and 180 degrees. A conduction angle approaching 0 degrees would result in the very narrow synchronizing range. A conduction angle approaching 180 degrees would render the device incapable of counting. A good compromise is a 45 degree condition angle. Accordingly, the base electrode of transistor Q2 is gated open as it were for 90 degrees out of 360 degrees. Only an impulse occurring in this "window" is capable of affecting the oscillator 6. Since the oscillator 6 is initially off slightly in frequency, the "window" drifts towards one of the impulses of signal 2D. When the two occupy the relative position of 2E, the oscillator is locked and remains so locked. The impulses occurring outside of the zero crossover points are lost in the angle during which the base electrode is locked off by the self bias action of the oscillator. The angle of conduction for the oscillator is determined by the constant R12×C6 in the emitter circuit of Q2. It is thus seen that from the output of the rectifier 3 shown by waveform 2C to the output of the oscillator 6, the operations remain in a time domain. The operation of counting and removing all perturbing components are accomplished by time separation which is phase rigid. Thus, it is evident that synchronization of the oscillator signal can be determined at any point by the biasing of the emitter of Q2 which is determined by the R12×C6 combination, so that the entering pulse position in synchronism is then determined by the bias point at which the oscillator 6 operates. The undesired spikes for synchronization such as 10 are submerged or damped off because they occur below the set bias level to prevent them from flipping or doubling the oscillator signal. It is observed that the spikes of zero voltage 9 of the clipped and amplified waveform D corresponding to the signals of the first part of Equation *m*, that is, twice the carrier frequency, occur at or near the zero crossing point of the oscillator output wave E. If the zero crossings 9 of waveform D, which are of twice the carrier frequency, do not coincide with the zero cross over points of the oscillator signal, then the waveform D voltage causes a component of the oscillator 6 plate current which may change the phase angle of the oscillator signal vector. That is, the frequency of the oscillator signal may be increased or decreased depending on whether the phase of the oscillator plate current produced by the waveform D voltage is lagging or leading the phase of the free-running oscillation current at the start of the cycle of the oscillator signal. If the frequency of the injected signal is greater or less than the oscillator frequency, a synchronization occurs only when the oscillator signal zero crossings coincide with the zero voltage spikes 9 of the injected signal. It is to be understood that the injected signal D must be always of sufficient amplitude so that the oscillator will adjust itself almost instantaneously to every change in frequency of the injected signal. If the Q of the tank is not so low as to permit synchronization to an instantaneous change of frequency equal to or greater than twice the modulation frequency, it will serve to filter out the component corresponding to the second term of Equation *m*. It may be considered that the Q of the tank is equal to an electrical inertia which keeps the oscillator frequency synchronized to the carrier frequency and controlled by it, so that when the relatively few zero crossover spikes 10 of the rectified modulating signals corresponding to the signals of the second part of Equation *m* enter the oscillator circuit, they have very slight influence to effectuate a change in the free-running frequency of the oscillator. In other words, the oscillator will be non-responsive to and will over-ride these zero cross over spikes 10 of the modulating signal; thus, in effect, filtering out the component corresponding to the second term of Equation *m*. The result is that the two operations required on *m*, that is, separating the signals corresponding to the first part of the equation from signals corresponding to the second part of the equation and producing a resultant output signal which is one half of the frequency of the signals corresponding to the first part of Equation *m* are accomplished. It is apparent that the zero crossing detector 5, consisting of the full-wave rectifier 3 and the clipper amplifier 4, together with the oscillator 6 constitute a computer to derive from the upper and lower sidebands or set of harmonics thereof an unperturbed output signal of the suppressed carrier frequency, such as waveform *a*, and of the correct phase in relation to the sidebands at the input to the modulator 7.

In practice static phase errors due to various circuit components such as stray capacities, transformers, etc. accumulate and have to be removed by a more or less sophisticated network, an example of which are element R4 and C9 in Fig. 3.

The examples shown here are of a suppressed carrier amplitude modulated signal due to modulation by a single tone, although modulation can be due to a complex set of tones. It is only for simplicity and ease of understanding that modulation patterns are shown in terms of modulation by a simple sine wave. This demodulation system will operate equally well under the substance of complex tone modulation.

The application of the phase synchronized generated carrier output of the oscillator 6, together with the received signals to the modulator 7, results in a spectrum containing the modulating frequency, as well as a spectrum of high frequency modulation products which can be removed by means of the low-pass filter 8, to give an output consisting only of the modulating signal. If the carrier is introduced, it is demodulated as D.C.

It should be noted that while this method of reception does not require the emission of a carrier in order to detect double sideband amplitude modulated signals, nevertheless the presence of carrier does not interfere with its operation. Thus, the receiver can operate equally well with emitted carrier double sideband amplitude modulated with carrier or suppressed carrier. The detection process produces D.C. at the output of the low-pass filter in response to the presence of carrier. This D.C. can be either ignored or used for some unspecified control function.

The circuit of this invention has been reduced to practice, as shown by the schematic diagram of Fig. 3, in a system where the suppressed carrier frequency is 96 kc.

I claim:

1. A synchronous demodulaton system for double sideband suppressed carrier communication systems comprising a source of input radio frequency signals containing upper and lower sidebands symmetrically disposed with reference to a suppressed carrier frequency, means to filter from said input signals all signals except said upper and lower sideband signals, a zero crossing detector, means to apply said upper and lower sideband signals to said zero crossing detector to derive rectified signals with null voltage points corresponding to the zero crossovers of said upper and lower sideband signals, said rectified signals containing a given signal having a frequency equal to a multiple of the frequency of said suppressed carrier, an oscillator circuit coupled to the output of said zero crossing detector, said oscillator circuit comprising means to filter out from said rectified signals all other signals except said given signal, gating means responsive to saia given signals, and means to cause said gating means to conduct during a predetermined angle of conduction whereby the frequency of said oscillator circuit is synchronized to a frequency equal to the frequency of said given signal multiplied by the reciprocal of said given multiple to obtain as the output of said oscillator circuit a signal having a frequency equal to the frequency of said suppressed carrier and in phase coincidence therewith, and means to combine said oscillator output signal with said upper and lower sideband signals to synchronously detect thereby the modulation signal of said input signals.

2. A synchronous demodulation system for double sideband suppressed carrier communication systems according to claim 1 wherein the zero crossing detector comprises full wave rectifying means to rectify said upper and lower sideband signals and a clipper amplifier to limit said rectified signals to a common level.

3. A synchronizable oscillator circuit comprising an oscillator circuit tuned to a given frequency, a source of input signals containing a signal of a first frequency substantially equal to said given frequency modulated by signals of a second frequency, means to derive from said input signals a mixture of signals including a signal having a frequency equal to a multiple of said first frequency signal in phase coincidence with said first and second frequency signals and a signal having a frequency equal to a multiple of said second frequency signal, said oscillator circuit further comprising transistor gating means being responsive to the signal of the multiple of said first frequency signal, means to cause said transistor gating means to conduct during a predetermined angle of conduction and to pull the given frequency of the oscillator into synchronism and phase coincidence with said first frequency signal and said means to derive from said input signals said mixture of signals include a zero crossing detector comprising full wave rectifying means and a clipper amplifier.

4. A synchronizable oscillator circuit according to claim 3 wherein said full wave rectifying means rectify said input signals to signals of one polarity containing at least the second harmonics of said signals of said first and second frequencies and said clipper amplifier limits said rectified signals to a common level and containing therein the null voltage points of said signals of said first and second frequencies.

5. A synchronizable oscillator circuit as in claim 4 wherein the Q of the tank circuit of said oscillator circuit is of sufficient magnitude to pull the given frequency of said oscillator circuit into synchronism with said signals of said second harmonic of said first frequency signals and said magnitude is sufficient to prevent said given frequency from being synchronized with the said signals of said second harmonics of said second frequency signals.

6. A synchronizable oscillator circuit comprising an oscillator circuit generating a signal having a free-running frequency determined by the constants of said oscillator circuit, a source of input signals containing a signal of a first frequency substantially equal to said free-running frequency, modulated by signals of a second frequency, full wave rectifying means coupled to said input signals to rectify said input signals to signals of one polarity and containing at least the second harmonics of said signals of said first and second frequencies, a clipper amplifier coupled to said rectifying means to limit said rectified signals to a common level containing therein the null voltage points corresponding to the crossovers of said first and second frequency signals, said oscillator circuit comprising a tank circuit, a transistor having a base electrode, an emitter electrode and a collector electrode, means to apply the output of said clipper amplifier to said base electrode, means coupled to said emitter electrode to cause said transistor to conduct during a predetermined angle of conduction to synchronize the said null points of said rectified signals of said first frequency to the null voltage points of said oscillator signal thereby pulling said free-running frequency of said oscillator signal into synchronism and phase coincidence with said signal of the first frequency, said magnitude of the Q of said tank circuit being sufficient to prevent said oscillator signal from synchronizing with said signal of said second frequency.

References Cited in the file of this patent

UNITED STATES PATENTS

| | | |
|---|---|---|
| 2,193,801 | Byrne | Mar. 19, 1940 |

FOREIGN PATENTS

| | | |
|---|---|---|
| 370,449 | Great Britain | Apr. 8, 1932 |
| 264,464 | Switzerland | Jan. 16, 1950 |

OTHER REFERENCES

Book: Vacuum Tube Oscillators by Edson John Wiley, 1953, pages 318 to 320.